UNITED STATES PATENT OFFICE.

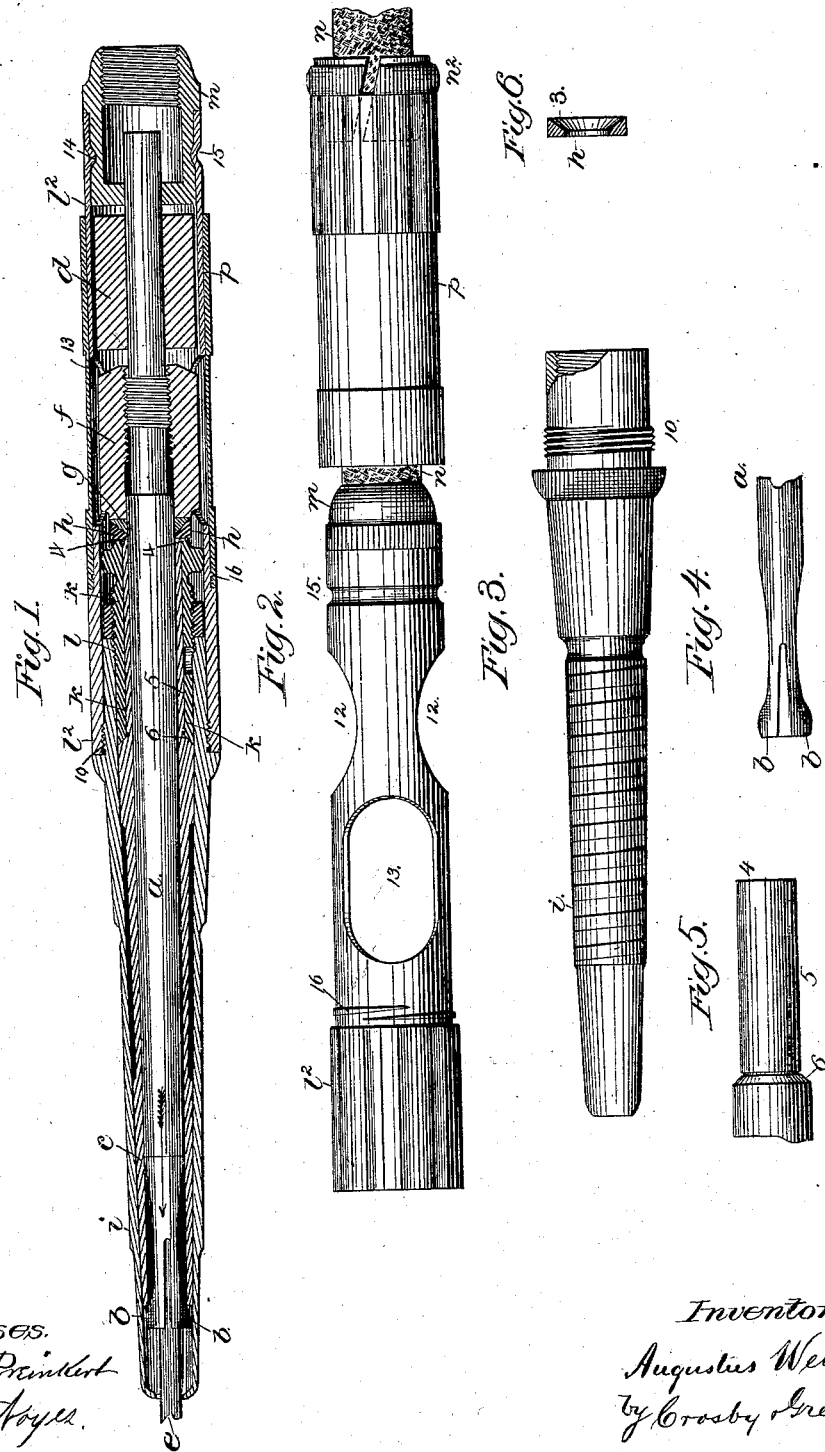

AUGUST WEBER, OF NEW YORK, N. Y., ASSIGNOR OF ONE-HALF TO GEORGE E. HODGE, OF SAME PLACE.

DENTAL DRILL.

SPECIFICATION forming part of Letters Patent No. 261,795, dated July 25, 1882.

Application filed July 29, 1881. (Model.)

*To all whom it may concern:*

Be it known that I, AUGUST WEBER, of the city, county, and State of New York, have invented a new and useful Improvement in Hand-Pieces for Dental Engines, of which the following description, in connection with the accompanying drawings, is a specification.

This invention in hand-pieces is an improvement on my former Patent No. 231,945, September 7, 1880, to which reference may be had. In that patent the rotating sleeve was connected with the chucking-spindle by a pin, and to change the tool the spindle and sleeve had to be stopped and a nut on the spindle had to be turned and loosened to permit the spindle to move longitudinally on the sleeve to loosen the tool, and vice versa.

In this my present invention I have done away with the pin-connection between the rotating sleeve and chucking-spindle, and compel the spindle by frictional adhesion to carry the sleeve with it.

I have provided the spindle with a fixed collar, placed thereon at the rear of a loose nut, said nut being screw-threaded at one end and fitted to left-hand screw-threads of the spindle, so that while the front end of the loose nut or a washer at its front end is in contact with the rear end of the rotating sleeve the rotation of the spindle by grasping its fixed collar while the loose nut is held stationary causes the spindle to be moved longitudinally in the sleeve to release or grasp the tool; or the collar may be held and the nut rotated, if desired.

I have introduced between the loose nut and rotating sleeve a washer, one face of which is made flat, while its other face is concaved to receive the convexed side of a second washer, the flat side of which rests against the end of the loose nut. These concaved and convexed washers so placed in contact enable the washers to move one on the other to a slight extent, which I have found to be of considerable advantage in insuring steady rotation of the spindle or in reducing vibration at its rear end when rotating rapidly, the said washers, shaped as shown, also serving to better adapt themselves to pressure between the ends of the loose nut and the rear end of the sleeve than if made in one piece of uniform thickness.

I have provided the large end of the casing referred to in my former patent with a screw-thread to form a connecting means with the tubular cover, and this cover is provided with suitable openings opposite the collar and loose nut of the spindle, the said tubular cover receiving over it a shield, which is united with a threaded part of the tubular cover.

The chuck employed is split at its end and made conical externally to fit correspondingly-tapered portions of the casing, substantially as in my patent, and the shank of the tool is nicked to engage a pin in the spindle, as shown in my application filed October 7, 1879, to prevent the tool being drawn out longitudinally.

I have provided the rear end of the tubular cover with a swiveling or loose union, screw-threaded internally for connection with it of the tubular covering of the driving-shafting, the said union being preferably held in place by forcing a part of the cover into an annular groove of the union.

Disclaiming herein whatever there is in this invention resembling the invention heretofore made by me, I desire it to be understood that I confine myself herein to the several features set forth in the claims following.

Figure 1 represents in longitudinal section a hand-piece containing my present improvement, the spindle and tool being, however, in elevation. Fig. 2 shows the cover removed and the shield drawn off from it back against the shield-stop on the tubular shell of the driving-shafting, the cover being broken out to show the union and the groove thereon. Fig. 3 shows the casing alone. Fig. 4 is an enlarged detail of the chucking end of the spindle and sleeve. Fig. 5 is a detail of the rear end of the sleeve, and Fig. 6 a detail of washer *h*.

The spindle *a*, which will be connected at its rear end, as usual, with the driving-shafting, has its front end made conical externally, and bored and split to form, preferably, three chucking-prongs, *b*, which are subsequently bent outward, somewhat as in the enlarged detail, Fig. 4, to enable the prongs to serve as springs to act against the outer end of the rotating sleeve *c*, and cause the spindle to move out therefrom in the direction of the arrow when the spindle is loosened in the sleeve, as will be described, a coiled or other spring on the spindle being thus obviated.

The spindle has fixed upon it a milled collar, d, by which to hold and control or to rotate the spindle when fastening or loosening the tool e, and is also provided with a left-hand thread to receive the left-hand-threaded loose nut f.

In front of the nut f, I have placed a washer, g, having its face next the nut made flat, and its opposite face made convex, and next to the said washer I have placed on the spindle a second washer, h, having one concaved side, 3, and its other side flat.

If the spindle a is turned to the right by grasping the milled collar d fixed to it, while the flat side of washer h rests against the end 4 of the reduced part 5 of the rotating sleeve c, and the said washer is held by the nut f, the spindle will, it is obvious, be moved longitudinally in the direction opposite the arrow on it in Fig. 1, and will cause the prongs b to be closed by the action of their inclined outer sides against the sleeve c. The spindle so drawn back into the sleeve causes the jaws to become wedged or pressed closely against the sleeve near its front end, while the washer and nut f are caused to press against the rear end, 4, of the sleeve.

The pressure between the spindle, sleeve, and washer produces sufficient friction to cause the sleeve and spindle to adhere and move together. This frictional connection of the sleeve and spindle thus causes them to travel together, as did the slot-and-pin connection described in my former patent.

The sleeve, held to the spindle by friction and rotating in unison with it, serves as a revolving bearing for the spindle; but the spindle is not worn by reason of its rotation, for the sleeve, having its end supported in the outer casing, i, and the nut k, takes the wear.

The forward end of the spindle c, or that nearest the jaws b, is tapered, it being of smaller diameter at its outer end than a little to the rear of it, and this tapered end of the sleeve takes its bearing in a correspondingly-tapered portion of the interior of the outer casing, as shown in Fig. 1, the inner wall of the said casing forming a tapering bearing for the tapered surface of the sleeve c.

The washers g and h are very desirable for the production of a hand-piece with the minimum of jar; but I do not confine my invention to their use, as the end of the nut f may bear directly against the end of the sleeve or against a single washer. It is best, however, to use washers g h, and of the shape shown.

The rear end of the sleeve is reduced, as at 5, to form a conical bearing, 6, and the reduced end of the said sleeve is made to enter a bearing-nut, k, having an external screw-thread, l, which in turn is screwed into the threaded rear end of the casing i.

The end of the bearing-nut k next the enlarged part of the sleeve is concaved to fit the conical bearing 6, the insertion of the nut k into the casing more or less holding the sleeve c more or less tight in its bearings.

The outer portion of the enlarged rear end of the casing i has a screw-thread, 10, to receive the screw-threaded end of the cover $l^2$, provided with openings 12 13 opposite the collar d and the loose nut f, so that the collar can be readily grasped by the thumb and finger to stop the spindle, while the loose nut is turned by the other hand to move the spindle longitudinally with relation to the sleeve in the direction desired to loosen or tighten the chuck at the end of the spindle.

The two washers g h, shaped and placed in contact as described, rock the one on the other and lessen the tendency of the rapidly-rotating spindle to vibrate at its rear end.

The cover $l^2$, made of thin sheet metal, has a loose union, m, fitted into its outer end preferably by bending or forcing a portion of the metal of the said cover, as at 15, back into an annular groove, 14, made about the union externally.

The union m is threaded internally to receive the end of the tubular covering n, commonly used with the rotating shafting, the said union being loosely connected with the cover, so that it may rotate therein freely whenever the casing grasped by the operator is partially rotated in operating the tool or changing its angular position in the mouth of the patient. This tubular covering n is shown as provided with an adjustable stop, $n^2$, to arrest the backward movement of the tubular shield p. This shield p, when the hand-piece is in operation, is moved to inclose and surround the cover $l^2$ and close its openings 12 and 13.

The cover $l^2$ and shield p are retained in position with relation to each other by the screw-threads 16 on the cover and corresponding threads in the shield.

I claim—

1. The screw-threaded spindle, split and provided with jaws b to form a chuck, as described, the fixed collar d thereon, and the rotating sleeve c, shorter than the spindle, with its forward end resting against the tapering backs of the said jaws, combined with the loose nut f, having screw-threads in engagement with screw-threads on the spindle, and located between the inner end of the sleeve c and the fixed collar, substantially as and for the purpose described.

2. The screw-threaded spindle, split and provided with jaws b to form a chuck, as described, the fixed collar d thereon, and the rotating sleeve c, shorter than the spindle, with its forward end resting against the tapering backs of the said jaws, combined with the loose nut f, having screw-threads in engagement with screw-threads on the spindle, and located between the inner end of the sleeve c and the fixed collar, and with the outer casing, i, and the tubular bearing-nut k inserted therein, the said casing and nut sustaining and serving to form bearings for both ends of the said sleeve, all substantially as described.

3. The screw-threaded spindle, split at its end to form a chuck, the loose nut and fixed collar thereon, the rotating sleeve connected with the spindle frictionally, and the adjustable bearing-nut $k$, combined with the casing $i$, provided within it with a tapering bearing for the tapering external forward end of the sleeve $c$, and with the bearing-nut $k$, into which the rear end of the said sleeve is entered, substantially as shown, and for the purpose described.

4. The screw-threaded chucking-spindle, its loose nut $f$ and fixed collar $d$, and the rotating sleeve $c$, combined with the washers $g$ $h$, the adjacent faces of which are respectively convex and concave and their remote faces flat, the said washers being interposed between the loose nut and the sleeve, with their flat faces next adjacent thereto, whereby the said washers are enabled to move one upon another, substantially as and for the purpose described.

5. The screw-threaded spindle, split and provided with jaws $b$ to form a chuck, as described, the fixed collar $d$ thereon, and the rotating sleeve $c$, shorter than the spindle, with its forward end resting against the tapering backs of the said jaws, combined with the loose nut $f$, having screw-threads in engagement with screw-threads on the spindle, and located between the inner end of the sleeve $c$ and the fixed collar, and with the outer casing, $i$, and its tubular bearing-nut $k$, to sustain both ends of the sleeve, and the cover $l^2$, secured upon the casing, all substantially as shown and described.

6. The tubular covering $n$ and its stop $n^2$, combined with cover $l^2$, casing $i$, and shield $p$, as and for the purpose set forth.

In testimony whereof I have signed my name to this specification in the presence of two subscribing witnesses.

AUGUST WEBER.

Witnesses:
G. W. GREGORY,
L. F. CONNOR.